United States Patent
Eun

(10) Patent No.: US 7,447,784 B2
(45) Date of Patent: Nov. 4, 2008

(54) AUTHENTICATION METHOD USING CELLULAR PHONE IN INTERNET

(75) Inventor: Tak Eun, Ansan-shi (KR)

(73) Assignee: Microinspection, Inc., Kyunggi-do (KR)

(*) Notice: Subject to any disclaimer, the term of this patent is extended or adjusted under 35 U.S.C. 154(b) by 533 days.

(21) Appl. No.: 10/181,159

(22) PCT Filed: Jan. 18, 2001

(86) PCT No.: PCT/KR01/00084

§ 371 (c)(1),
(2), (4) Date: Jul. 16, 2002

(87) PCT Pub. No.: WO01/54438

PCT Pub. Date: Jul. 26, 2001

(65) Prior Publication Data

US 2003/0005136 A1    Jan. 2, 2003

(30) Foreign Application Priority Data

Jan. 18, 2000 (KR) ................................. 2000-2771
Feb. 7, 2000 (KR) ................................. 2000-5661

(51) Int. Cl.
*G06F 15/16* (2006.01)
*G06F 15/177* (2006.01)
*G06F 15/173* (2006.01)

(52) U.S. Cl. ................. 709/229; 709/220; 709/225

(58) Field of Classification Search .......... 709/224, 709/229, 225, 220; 395/187, 188
See application file for complete search history.

(56) References Cited

U.S. PATENT DOCUMENTS

| | | | | |
|---|---|---|---|---|
| 5,608,778 A * | 3/1997 | Partridge, III | ............... | 455/411 |
| 5,864,610 A * | 1/1999 | Ronen | ................... | 379/121.01 |
| 5,903,721 A * | 5/1999 | Sixtus | ........................... | 726/2 |
| 5,991,749 A * | 11/1999 | Morrill, Jr. | ................... | 705/44 |
| 6,023,689 A | 2/2000 | Herlin et al. | | |
| 6,112,078 A | 8/2000 | Sormunen et al. | | |
| 6,151,628 A * | 11/2000 | Xu et al. | ..................... | 709/225 |
| 6,401,066 B1 * | 6/2002 | McIntosh | .................... | 704/273 |
| 6,463,534 B1 * | 10/2002 | Geiger et al. | ............... | 713/168 |
| 2003/0050854 A1 * | 3/2003 | Showghi et al. | ............... | 705/26 |

FOREIGN PATENT DOCUMENTS

WO    WO 97/45814 A    12/1997

\* cited by examiner

*Primary Examiner*—John Follansbee
*Assistant Examiner*—Karen C Tang
(74) *Attorney, Agent, or Firm*—Harold L. Novick; Stanley N. Protigal; The Nath Law Group

(57) ABSTRACT

The present invention discloses an authentication method using a cellular phone in internet. According to the present invention, when connecting to internet or performing electronic commerce, the authentication is performed through the cellular phone in parallel with a personal information stored when user's joining the cellular phone service, a number particular to the cellular phone, a secret number in an authentication required for the connection or the settlement of accounts. Specifically, in authentication process for making up accounts, besides the line connected to internet, a separate cellular phone line is used and if the authentication data of the internet site server is identical to that of the cellular phone service company, the authentication process is completed, thereby eliminating the danger of hacking basically.

6 Claims, 7 Drawing Sheets

AUTHENTICATION METHOD USING CELLULAR PHONE IN INTERNET

BACKGROUND OF THE INVENTION

1. Field of the Invention

The present invention relates to an authentication method using a cellular phone in internet, and in particular to an authentication method using a cellular phone in internet in which when connecting to internet or performing electronic commerce an authentication process is performed through an internet site server in parallel with the cellular phone in the authentication requisite for the connection or the payment of cost. According to the present invention, since the authentication process is performed by using the plural communication lines, such as an internet line and a cellular phone line, the security of the communication lines can be obtained.

2. Description of the Background Art

Recently, computers have spread far and wide, internet techniques makes rapid progress and population using the internet increases by geometrical progression. Accordingly, the internet has been used as a channel for transmitting information on goods, services being provided, and advertisements etc. from a simple exchange function of information. Activities for purchase can be performed with the object of the whole world without restrictions of time and space through internet. As a result, an infrastructure, that is, electronic commerce, has been formed by advantages that distribution processes are shortened and manpower for sale is reduced.

As above, when connecting to an internet site or performing electronic commerce, in transactions requiring for security, safety of an authentication method is essential. In a conventional art, when a user connects to the internet, an authentication process is performed by providing a public key or an individual key for authenticating or by using a secret number optionally determined by the user and a security card.

However, in the conventional art, there are several disadvantages that the authentication process must be performed only by using the internet line connected to the user, and basically the authentication process through general communication lines are exposed to the danger of hacking because it is impossible to install high-degree security devices to the whole lines, which will be connected by common run of people.

SUMMARY OF THE INVENTION

Accordingly, it is an object of the present invention to solve the above problems by providing an authentication method using a cellular phone in internet, in which when connecting to internet or performing an authentication process for electronic payment in electronic commerce, a separate cellular phone line in parallel with a line connected to internet is used and if the authentication data of an internet site server are identical to that of a cellular phone service company, the authentication process is completed, thereby capable of eliminating the danger of hacking basically.

In order to achieve the above-described object of one aspect of the present invention, an authentication method using a cellular phone in internet, comprises the steps of: recording information for the authentication and a cellular phone number when connecting to internet or performing authentication for an electronic payment in an electronic commerce server, requesting by the internet site server which has received the inputted information for authentication and the cellular phone number, for approval of the authentication from an authentication server of a cellular phone service company having the user's recorded information of the authentication, transmitting the request for approval of the authentication from the authentication server of the cellular phone service company that received the request for approval of the authentication to the user's cellular phone, discriminating whether the user uses the registered cellular phone or not, when the user, after receiving the request for approval of the authentication inputs a secret number for approval of the authentication, through communication between the cellular phone and the authentication server of the cellular phone service company, comparing whether the registered authentication information and the authentication information required when authenticating are identical with each other or not, approving the authentication, and transmitting the approved result to the internet site server, and informing the user of the approved result through the internet site server which received the approved result.

According to the embodiment of the present invention as mentioned above, when connecting to internet or performing electronic payment after electronic commerce, if the internet electronic commerce server requests the approval of the authentication to the authentication server of the cellular phone service company, the authentication server communicates to the user's cellular phone with items, which are required for approval of the authentication, through a short message service and for registering a location. Thereafter the authentication server compares data, based upon authentication information inputted through the internet line and the cellular phone, a secret number, a number particular to the cellular phone, transmit-receive of encryption between the cellular phone and the authentication server of the cellular phone service company, and thereafter approves the authentication, thereby basically preventing danger of hacking through a single line and securing safety in internet site connection or of electronic payment in electronic commerce.

In another aspect of the present invention, an authentication method using a cellular phone in internet comprises the steps of: recording information for authentication and a cellular phone number when connecting to internet or performing authentication for an electronic payment, requesting by the internet site server which has received the inputted information for authentication and the cellular phone number, for approval of the authentication from an authentication server of a cellular phone service company having the user's recorded information of the authentication, discriminating whether the user uses a registered cellular phone or not when the user calls through the cellular phone in order to perform an authentication process, comparing whether the registered information of the authentication and the inputted information of the authentication requested when authenticating, are identical or not, approving the authentication, and transmitting the result of approval of the authentication to the internet site server, and informing the user of the approved result through the internet site server which received the approved result.

According to another embodiment of the invention, as mentioned above, when connecting to internet or performing electronic payment after electronic commerce, when the user calls to the authentication server of the cellular phone service company, the authentication server compares data through authentication information inputted through the internet line and the cellular phone, a secret number, a number particular to the cellular phone, transmit-receive of an encryption between the cellular phone and the authentication server of the cellular phone service company, and thereafter approves the authentication, thereby basically preventing danger of hacking through a single line and securing safety of electronic payment in internet site connection or electronic commerce.

BRIEF DESCRIPTION OF THE DRAWINGS

The present invention will be better understood with reference to the accompanying drawings, which are given only by way of illustration and thus are not limitative of the present invention, wherein.

DETAILED DESCRIPTION OF THE PREFERRED EMBODIMENTS

An authentication method using a cellular phone in internet in accordance with a preferred embodiment of the present invention will now be described with reference to the accompanying drawings.

Figure 1:
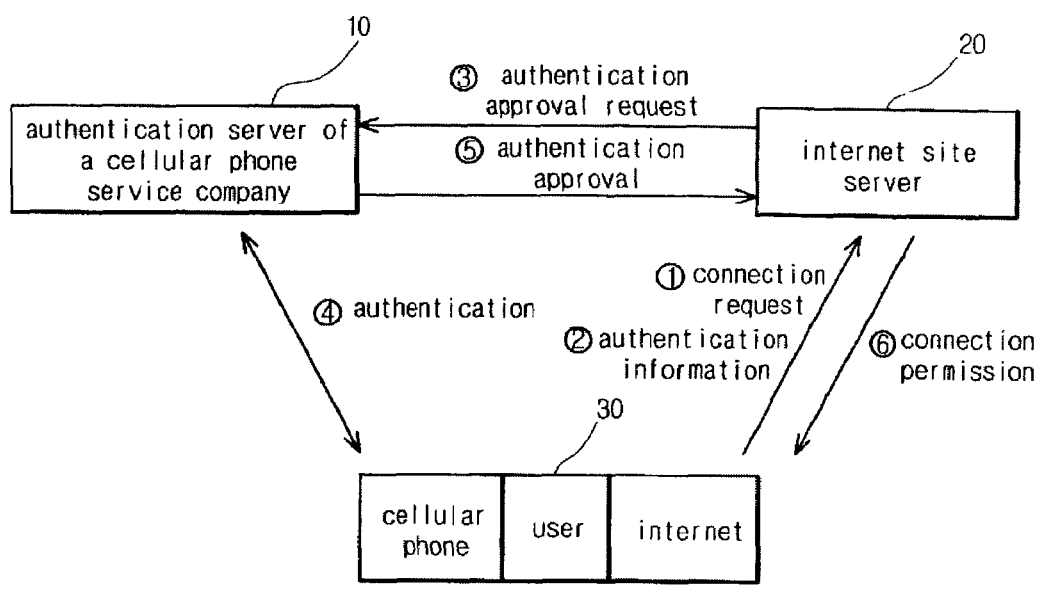
FIG. 1 is a construction view illustrating an authentication method using a cellular phone when connecting to internet in accordance with the present invention.
Figure 2:
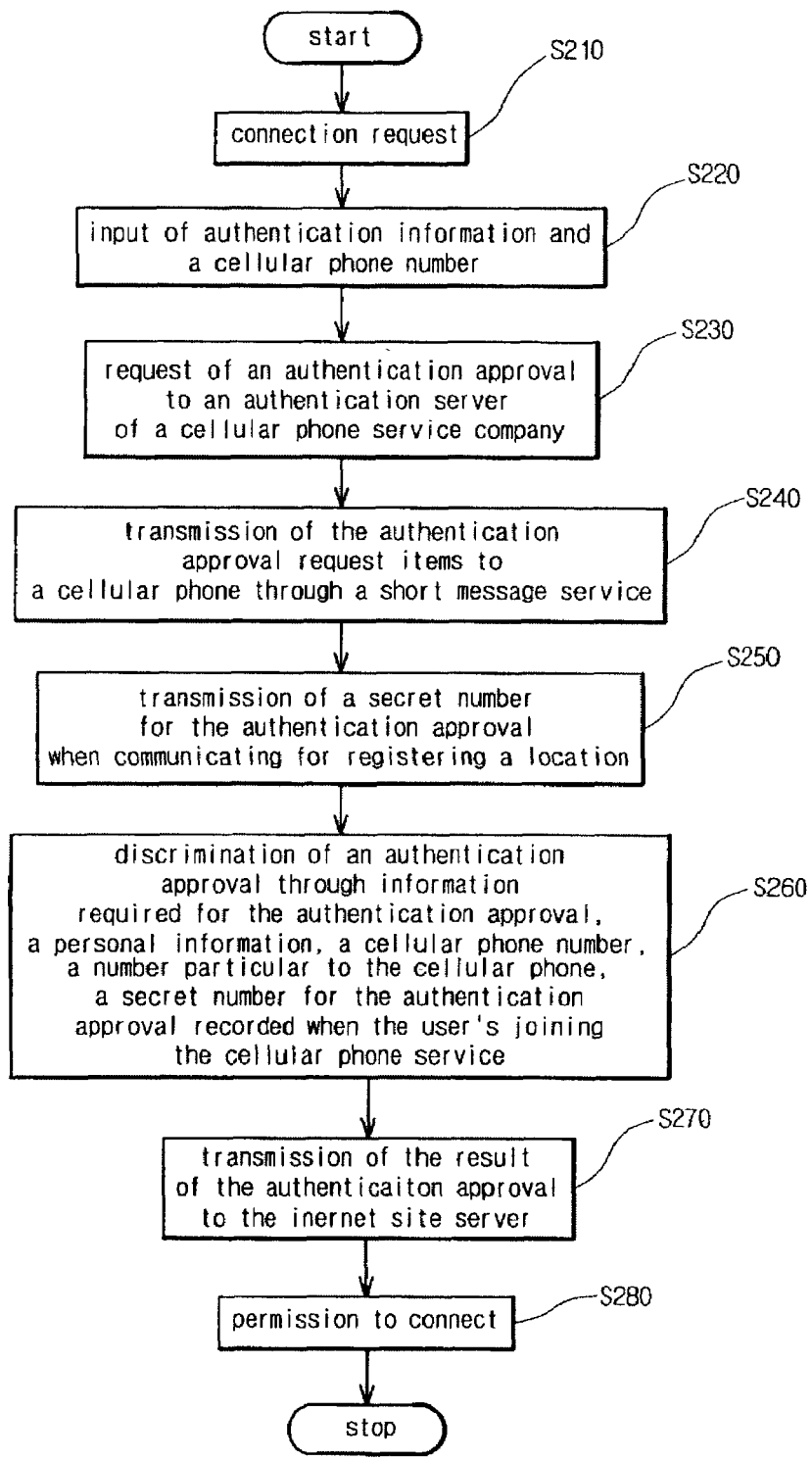
FIG. 2 is a flow chart illustrating an authentication method using a cellular phone when connecting to internet in accordance with the present invention.
Figure 6:
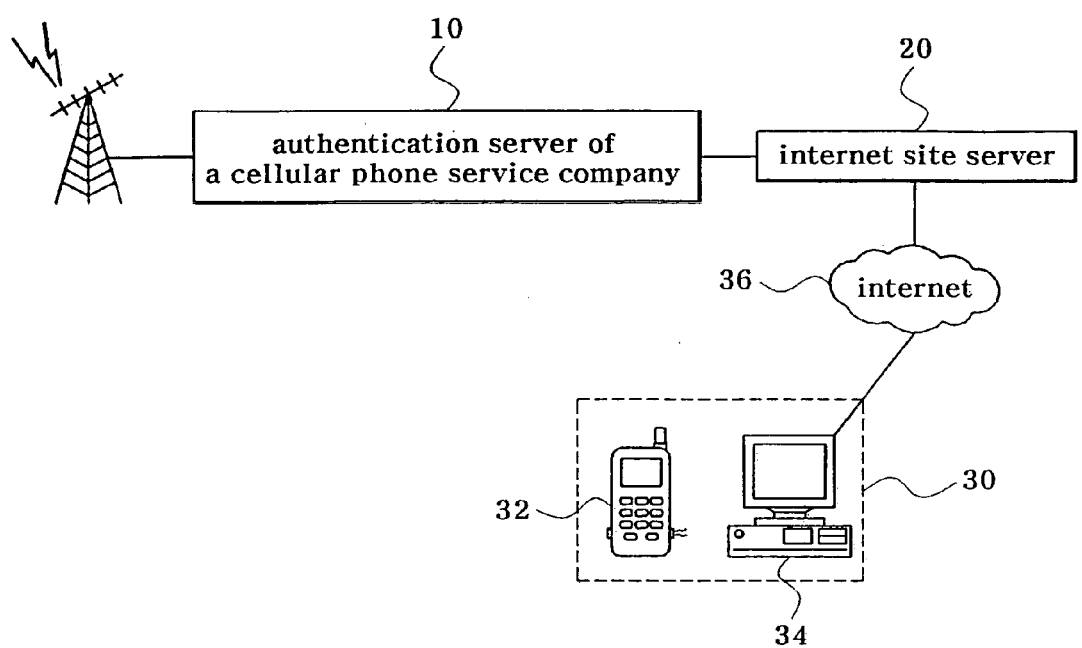
FIG. 6 is a construction view illustrating an authentication method using a cellular phone when connecting to the internet as shown in FIGS. 1 and 2.

FIG. 6 is a construction view illustrating an authentication method using a cellular phone when connecting to the internet as shown in FIGS. 1 and 2.

As illustrated, the user connects to the internet 36 through the user computer 34, and to the internet 36 is connected the internet site server 20 providing a variety of information through the internet. The internet site server 20 is interconnected to the authentication server 10 of the cellular phone service company by use of a line with encryption and security means of high quality.

The user stores encryption algorithm or random number data provided by applying the service to the digital cellular phone service company, whereby safety is guaranteed in the authentication, and records a variety of personal information, the proper number of the user cellular phone terminal 32 and the secret number for authentication, in the user cellular phone terminal 32.

FIG. 1 is a construction view illustrating an authentication method using a cellular phone when connecting to internet in accordance with the present invention. As shown in FIG. 1, interrelationship of a user 30, an internet site server 20, an authentication server 10 of a cellular phone service company is illustrated.

To perform the authentication processes as above, as an essential prerequisite, a mutual contract between an internet electronic commerce service company and a cellular phone service company for an authentication service must be concluded and also a user stores an encryption algorithm and random number data to one's cellular phone when applying for the service to the cellular phone service company, so that safety of authentication can be guaranteed.

At this time, a line securing high-degree encryption and a security device is used between the authentication server 10 of the cellular phone service company and the internet site server 20 and so security of line is guaranteed.

In a state where the above preceding processes are completed, as shown in FIG. 1, the user 30 requests connection for connecting the internet site server 20 and then inputs information required for authentication and a cellular phone number.

And so, the internet site server 20 transmits the inputted authentication information to the authentication server 10 of the cellular phone company relating to the inputted information and requests approval of authentication.

Thereafter, the authentication server 10 of the cellular phone company, which received the authentication information, in the state where the approval of authentication is requested, when the user 30 calls through one's cellular phone in order to perform an authentication process, compares information inputted by the cellular phone with previous information required for authentication such as authentication information recorded when joining the cellular phone service, an inputted secret number, and a number particular to the cellular phone, and thereafter transmits the result of approval of authentication to the internet site server 20.

Thereafter, the internet site server 20 that received the data from the authentication server 10 permits the user 30 to connect to the internet site.

An embodiment of the present invention having the authentication processes as mentioned above will be described in detail with reference to FIG. 2.

FIG. 2 is a flow chart illustrating an authentication method using a cellular phone when connecting internet in accordance with the present invention.

First, a user requires the internet site server to be connected in step S210. Then, the internet site server requests the user to input user's personal information such as user's registration number, a driver's license number together with a cellular phone number. According to this, the user inputs one's personal information and a cellular phone number in step S220. At this time, the input information can be set as one's ID (Identification number) and a cellular phone number for a simple and rapid authentication.

Thereafter, the authentication information inputted by the user is transmitted to the authentication server of a cellular phone service company based upon the inputted cellular phone number and then an approval of the authentication is requested in step S230.

According to this, the authentication server of the cellular phone service company transmits contents of the approval of the authentication from the internet site server to the user's cellular phone through a SMS(short message service) in step S240.

Then, if the requirement of the approval of authentication is right, the user pushes a secret number for the approval of the authentication. The inputted secret number is transmitted when performing a communication between the cellular phone and the cellular phone service company in order to register a location in step 250, and thereafter the authentication server 10 discriminates whether the inputted information and previous information, such as personal information, a number particular to a cellular phone, and a secret number, for the approval of the authentication, recorded when the user's joining the cellular phone service, is identical to each other or not and thereafter, according to the discriminating result, the authentication is approved in step S260.

At this time, the authentication server of the cellular phone service company transmits a cipher to the cellular phone by an encryption algorithm or a random number table recorded in the cellular phone and thereafter discriminates whether the cellular phone is registered properly or not through a response signal. Thereafter, the approval of the authentication is determined finally.

Thereafter, the authentication server 10 transmits the requested result of the approval of the authentication to the internet site server in step S270.

Then, the internet site server, which has received the data from the authentication server, permits the user to connect to the internet site in step S280.

Figure 3:
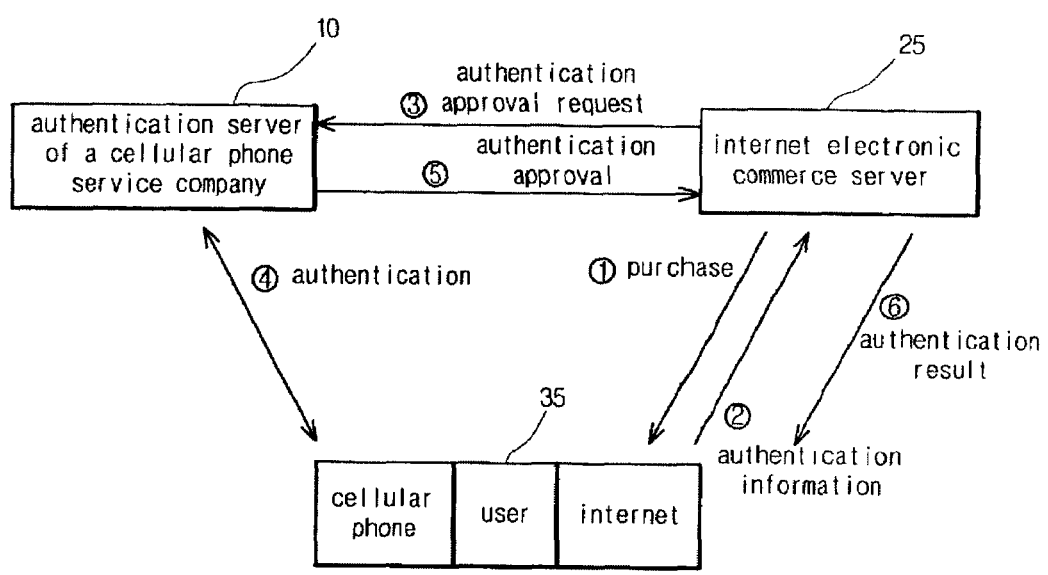
FIG. 3 is a construction view illustrating an authentication method of electronic commerce in internet using a cellular phone in accordance with the present invention.
Figure 4:
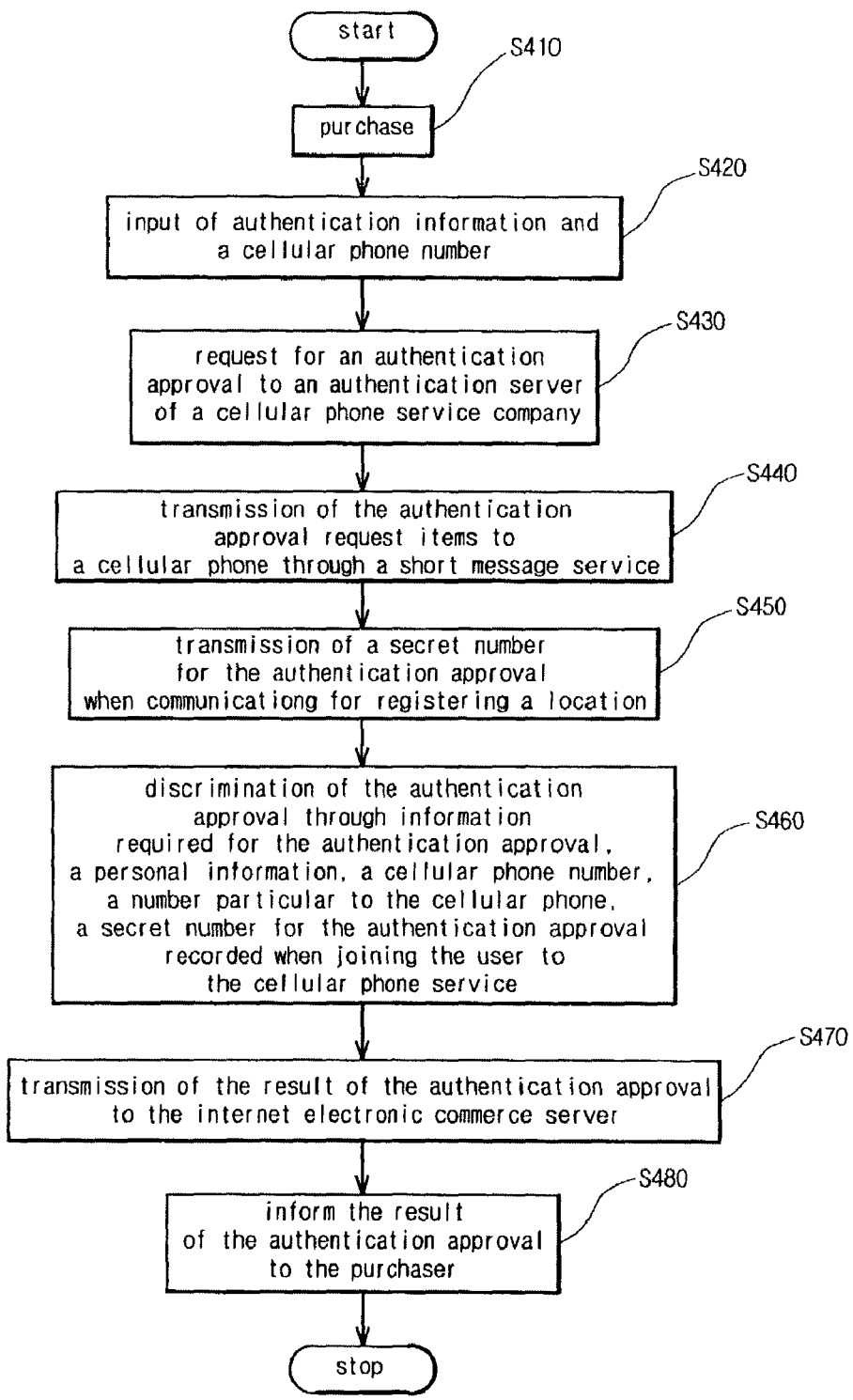
FIG. 4 is a flow chart illustrating an authentication method of electronic commerce using a cellular phone in internet in accordance with the present invention.
Figure 5:
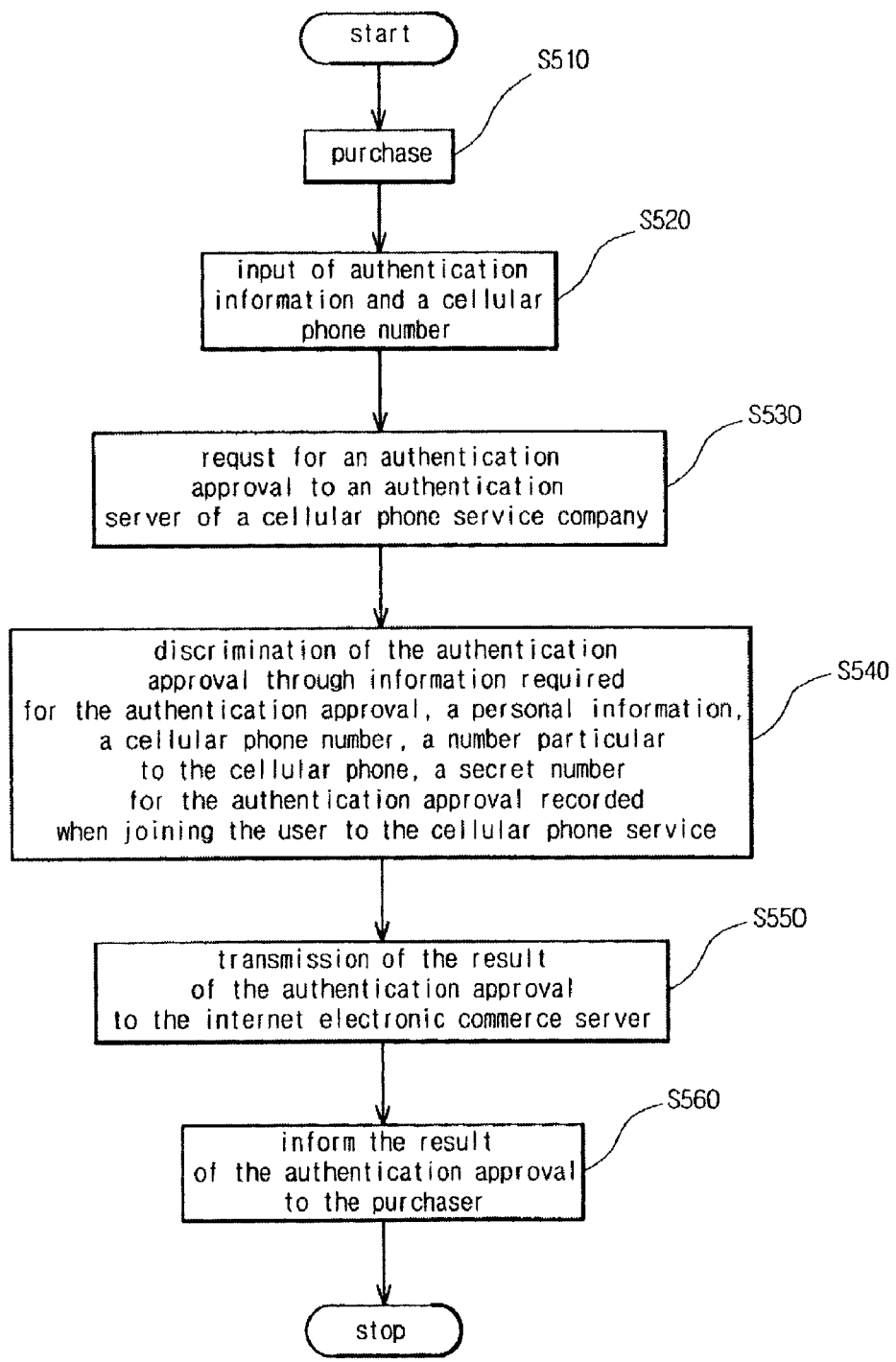
FIG. 5 is a flow chart illustrating an authentication method of electronic commerce using a cellular phone in internet in accordance with another embodiment of the present invention.
Figure 7:
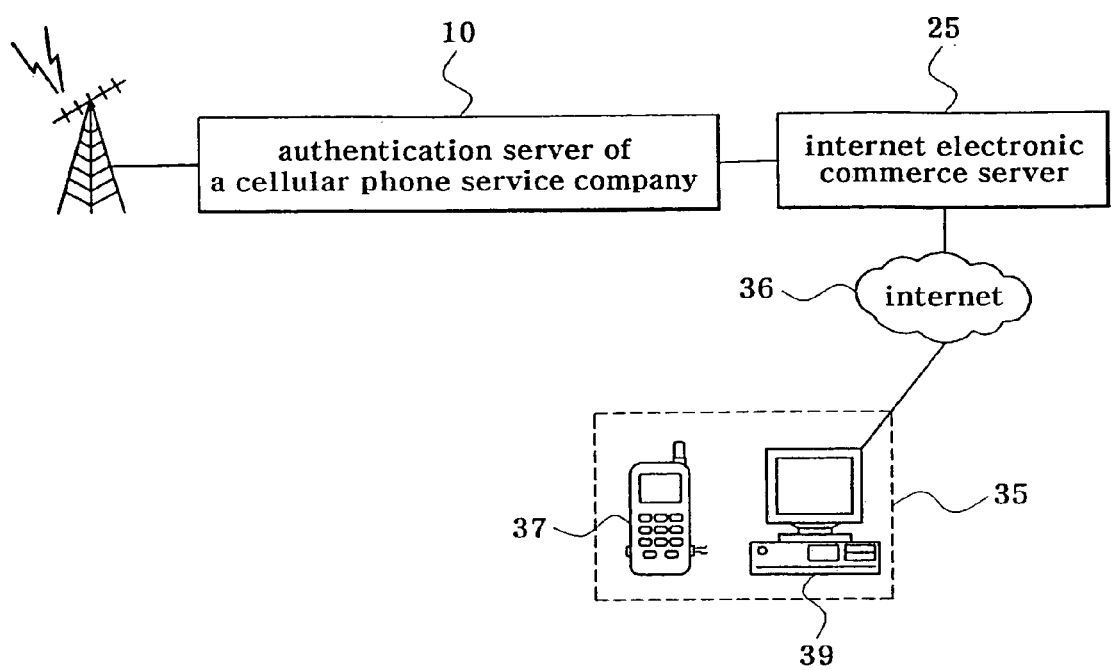
FIG. 7 is a construction view illustrating an authentication method using a digital cellular phone when performing the internet electronic commerce as shown in FIGS. 3-5.

FIG. 7 is a construction view illustrating an authentication method using a digital cellular phone when performing the internet electronic commerce as shown in FIGS. 3-5.

As illustrated, the purchaser connects to the internet 36 through the purchaser computer 39, and to the internet 36 is connected the internet electronic commerce server 25 providing the electronic commerce service through the internet 36. The internet electronic commerce server 25 is interconnected to the authentication server 10 of the digital cellular phone service company by use of a line with encryption and security means of high quality.

The purchaser stores encryption algorithm or random number data provided by applying the service to the digital cellular phone service company, whereby safety is guaranteed in the authentication, and records a variety of personal information, the proper number of the purchaser cellular phone terminal 37 and the secret number for the authentication, in the purchaser cellular phone terminal 37.

FIG. 3 is a construction view illustrating an authentication method of electronic commerce in internet using a cellular phone in accordance with the present invention. As shown in FIG. 3, interrelationship of a purchaser 35, an internet electronic commerce server 25, an authentication server 10 of a cellular phone service company is illustrated.

A purchaser 35 connects to the internet electronic commerce server 25 and then purchases goods and information etc. Thereafter, when performing an authentication process for making up accounts, the purchaser 35 inputs authentication information and a cellular phone number required for the authentication.

And so, the internet electronic commerce server 25 transmits the inputted authentication information to the authentication server 10 of the cellular phone company relating to the inputted information and requests the approval of the authentication.

Thereafter, the authentication server 10 of the cellular phone company, which has received the authentication information, in the state where the approval of the authentication is requested, when the user 30 calls through one's cellular phone in order to perform the authentication process, compares information inputted through the cellular phone with previous information required for the authentication such as authentication information recorded when the purchaser joined the cellular phone service, an inputted secret number, and a number particular to the cellular phone and, thereafter transmits the result of approval of authentication to the internet electronic commerce server 25.

Thereafter, the internet electronic commerce server 25, which has received the data from the authentication server 10, informs the result of the approval of the authentication to the purchaser 35 through internet.

An embodiment of the present invention having the authentication processes as mentioned above will be described in detail with reference to FIG. 4.

FIG. 4 is a flow chart illustrating an authentication method of electronic commerce using a cellular phone in internet in accordance with the present invention.

As shown in FIG. 4, the purchaser connects a site for providing a service of electronic commerce through internet and then purchases goods in step S410. Then, the internet electronic commerce server requests input of purchaser's personal information such as a registration number, a driver's license number together with a cellular phone number joined by oneself in order to receive the authentication that the act of purchasing is performed by a real purchaser. According to this, the purchaser inputs one's personal information and a cellular phone number in step S420. Thereafter, the authentication information inputted by the purchaser is transmitted to the authentication server of the cellular phone service company based upon the inputted cellular phone number and then the approval of the authentication is requested in step S430.

According to this, the authentication server of the cellular phone service company transmits contents of the approval of authentication from the internet electronic commerce server to the purchaser's cellular phone through a SMS(short message service) in step S440.

Then, if the requirement of the approval of the authentication displayed at the cellular phone is right, the purchaser pushes a secret number for the approval of the authentication. Then, the inputted secret number is transmitted when performing communication between the cellular phone and the cellular phone service company in order to register a location in step 450, and thereafter the authentication server discriminates whether the inputted information and previous information, such as personal information, a number particular to a cellular phone, and a secret number for approval of authentication recorded when the purchaser's joining the cellular phone service, is identical to each other or not and thereafter, according to the discriminating result, the authentication is approved in step S460.

At this time, the authentication server of the cellular phone service company transmits a cipher to the cellular phone by an encryption algorithm or a random number table recorded in the cellular phone and discriminates whether the cellular phone is registered properly through a response signal. Thereafter, the approval of the authentication is determined finally.

Thereafter, the authentication server 10 transmits the requested result of the approval of the authentication to the internet electronic commerce server in step S470.

Then, the internet electronic commerce server informs the result of the approval of the authentication to the purchaser through internet in step S480.

FIG. 5 is a flow chart illustrating an authentication method of electronic commerce using a cellular phone in internet in accordance with another embodiment of the present invention.

First, a purchaser connects a site for providing a service of electronic commerce through internet and then purchases goods in step S510. Then, the internet electronic commerce server requests input of purchaser's personal information such as a registration number, a driver's license number together with a cellular phone number joined by oneself in order to receive an authentication that the purchasing is performed by a real purchaser. According to this, the purchaser inputs one's personal information and a cellular phone number in step S520. Thereafter, the authentication information inputted by the purchaser is transmitted to the authentication server of the cellular phone service company based upon the inputted cellular phone number and the approval of the authentication is requested in step S530.

According to this, the authentication server of the cellular phone service company stores, for a certain length of time, contents of the approval of the authentication from the internet electronic commerce server and when the user 30 calls through the cellular phone in order to perform the authentication process, discriminates whether the information inputted by the cellular phone and previous information, such as personal information, a number particular to the cellular phone, and a secret number for the approval of the authentication recorded when the purchaser's joining the cellular phone service, is identical to each other or not, and thereafter according to the discriminating result the authentication is approved in step S540.

At this time, the authentication server of the cellular phone service company transmits a cipher to the cellular phone by an encryption algorithm or a random number table recorded in the cellular phone and discriminates whether the cellular phone is registered properly or not through a response signal. Thereafter, the approval of authentication is determined finally.

Thereafter, the authentication server 10 transmits the requested result of the approval of the authentication to the internet electronic commerce server in step S550.

Then, the internet electronic commerce server informs the result of the approval of the authentication to the purchaser through internet in step S560.

As above, when calling to the authentication server of the cellular phone service company, the user can connect to the authentication server by using a special phone number for authentication.

As mentioned above, according to the present invention, there is an advantage that when connecting to internet or performing electronic commerce, the authentication is performed by using the cellular phone which is separately constructed against an internet line and therefore, a double security device through the internet electronic commerce server and the authentication server of the cellular phone service company is secured, thereby preventing hacking basically.

There is another advantage that the secret number of the cellular phone which is used for identifying the cellular phone in the cellular phone service company is used to connect to a special site or to authenticate the electronic payment, thereby capable of using a separate encryption method, which is different from that of the plural lines.

There is also an advantage that a transmission of information required for the authentication is performed between the cellular phone and the authentication server of the cellular phone service company through communications of a short message service and registration of location, thereby performing the authentication process without a direct calling to the cellular phone service company.

Meanwhile, the cellular phone service user applies for the registration of the authentication service to the cellular phone service company, thereby securing safety of the electronic payment when connecting to the internet site or performing electronic commerce and also at the position of the manager of the internet site, safety of the authentication process can be provided to the registered users through a single contract of the authentication service with the cellular phone service company without adapting the separate authentication device.

There is also an advantage that since the cellular phone service company can provide a new service it is easy to attract members and commercial profit can be obtained from the contracted internet site and members.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method of authenticating either a connection to an internet site server or an electronic payment in an electronic commerce server, the method comprising:

at the internet site server or the electronic commerce server, recording identification information and a cellular phone number from a prospective user wishing to connect to the internet site server or to undertake the electronic payment;

establishing communication from the internet site server or the electronic commerce server to an authentication server of a cellular phone company and relaying the identification information and the cellular phone number to the authentication server to initiate authentication of the prospective user by the authentication server based on a comparison of the identification information and recorded user information previously stored at the authentication server and associated with the cellular phone number;

seeking confirmation that the prospective user is authorized either to connect to the internet site server or to undertake an electronic payment by having the authentication server transmit a request for approval to the cellular phone number supplied from the prospective user via the internet site server or the electronic commerce server, the transmission performed by a short message service that is independent from the earlier connection between the prospective user and the internet site server or electronic commerce server;

at the authentication server, discriminating whether the prospective user uses the cellular phone identified by the cellular phone number in the identification information and, in response to the request for approval, if the prospective user transmits back to the authentication server a secret code previously stored in the authentication server as recorded user information associated with the cellular phone number;

at the authentication server, only approving the authentication for connection or electronic payment when the transmitted secret code is identical to the previously stored secret code;

from the authentication server, transmitting to the internet site server or the electronic commerce server an approval confirming the authority to connect to the internet site server or to undertake an electronic payment; and informing the user of the approved result through the internet site server or the electronic commerce server that received the confirmation of the authority to connect.

2. The authentication method according to claim 1, wherein the authentication process between the cellular phone and the cellular phone service company is performed through a short message service and a communication for registration of location.

3. The authentication method according to claim 1, wherein a line establishing a high-degree of an encryption device and a security device is used between the authentication server of the cellular phone service company and the internet site server.

4. The authentication method according to claim 1, wherein the cellular phone stores an encryption algorithm or a random table data when applying for a service to the cellular phone service company.

5. The authentication method according to claim 1, wherein the authentication information includes a user's personal information, a number particular to the cellular phone, and a secret code for approval authentication.

6. The authentication method according to claim 1, wherein in discriminating whether the cellular phone is registered, the authentication server of the cellular phone service company transmits a cipher to the cellular phone by an encryption algorithm or a random number table recorded when registering and thereafter discriminates whether the cellular phone is registered properly through a response signal.

* * * * *